United States Patent
Bermudez et al.

(10) Patent No.: US 10,101,238 B2
(45) Date of Patent: Oct. 16, 2018

(54) INTEGRATED VENTILATION AND LEAK DETECTION SYSTEM AND METHOD OF ASSEMBLY

(71) Applicant: General Electric Company, Schenectady, NY (US)

(72) Inventors: Rodolfo Bermudez, Queretaro (MX); Martin Lopez, Queretaro (MX); Heriberto Hernandez, Queretaro (MX)

(73) Assignee: General Electric Company, Schenectady, NY (US)

( * ) Notice: Subject to any disclaimer, the term of this patent is extended or adjusted under 35 U.S.C. 154(b) by 143 days.

(21) Appl. No.: 15/155,928

(22) Filed: May 16, 2016

(65) Prior Publication Data
US 2017/0328805 A1  Nov. 16, 2017

(51) Int. Cl.
G01M 3/02 (2006.01)
G01M 3/20 (2006.01)
F01D 21/00 (2006.01)

(52) U.S. Cl.
CPC ............ G01M 3/02 (2013.01); F01D 21/003 (2013.01)

(58) Field of Classification Search
CPC . G01M 3/00; G01M 3/02; G01M 3/20; F01D 21/00; F01D 21/003
See application file for complete search history.

(56) References Cited

U.S. PATENT DOCUMENTS

| 6,360,741 | B2 | 3/2002 | Truschel |
| 6,536,432 | B2 | 3/2003 | Truschel |
| 6,578,361 | B1 * | 6/2003 | Higginbotham ........ F01D 5/005 60/39.094 |
| 7,107,820 | B2 | 9/2006 | Nunnally et al. |
| 8,033,280 | B2 | 10/2011 | Heinonen |
| 8,333,191 | B2 | 12/2012 | Heinonen et al. |
| 8,922,379 | B1 | 12/2014 | Meyer |
| 2002/0014240 | A1 | 2/2002 | Truschel |
| 2002/0023426 | A1 * | 2/2002 | Schroeder ............... F01D 25/12 60/39.182 |

(Continued)

FOREIGN PATENT DOCUMENTS

| EP | 0137756 A2 | 4/1985 |
| EP | 0789836 A1 | 8/1997 |

(Continued)

OTHER PUBLICATIONS

Extended European Search Report and Opinion issued in connection with corresponding EP Application No. 17170593.2 dated Oct. 2, 2017.

*Primary Examiner* — Nguyen Ha
(74) *Attorney, Agent, or Firm* — Armstrong Teasdale LLP (57) ABSTRACT

A ventilation and leak detection system for use in an enclosure includes a ventilation duct extending at least partially through an interior chamber defined in the enclosure. The ventilation duct includes at least one inlet end positioned within a lower portion of the interior chamber and an outlet end. The at least one inlet end includes at least one opening defined therein and sized to enable air and fuel within the enclosure to be drawn into the ventilation duct to ventilate the enclosure. The system further includes a detection unit coupled in flow communication with the ventilation duct proximate to the outlet end for detecting fuel entrained within flow drawn into the ventilation duct.

18 Claims, 4 Drawing Sheets

(56) References Cited

U.S. PATENT DOCUMENTS

| | | |
|---|---|---|
| 2002/0088464 A1 | 7/2002 | Truschel |
| 2003/0154932 A1* | 8/2003 | Schell .................. F24H 9/2035 122/504 |
| 2004/0216514 A1 | 11/2004 | Nunnally et al. |
| 2008/0202526 A1 | 8/2008 | Heinonen |
| 2010/0078018 A1 | 4/2010 | Heinonen et al. |
| 2010/0326171 A1 | 12/2010 | Stauffer et al. |
| 2011/0277541 A1* | 11/2011 | Kadle ................ B60H 1/00978 73/40.7 |
| 2012/0090383 A1 | 4/2012 | Lopez et al. |
| 2013/0125626 A1 | 5/2013 | Pritchett |
| 2013/0228171 A1 | 9/2013 | Mansfield et al. |
| 2014/0080403 A1 | 3/2014 | Erickson et al. |
| 2014/0099876 A1* | 4/2014 | Saraswathi ............... F02C 7/18 454/335 |
| 2014/0260549 A1 | 9/2014 | Dudar et al. |
| 2014/0316638 A1 | 10/2014 | Dudar et al. |
| 2015/0082768 A1* | 3/2015 | Lopez-Parra ............ F02C 7/18 60/39.83 |
| 2015/0211954 A1 | 7/2015 | Agace |
| 2015/0214702 A1 | 7/2015 | Langlade et al. |
| 2015/0285171 A1 | 10/2015 | Dudar et al. |
| 2015/0308915 A1 | 10/2015 | Konatham et al. |
| 2015/0360860 A1* | 12/2015 | Hilton .................. F17C 13/084 220/562 |
| 2016/0091386 A1* | 3/2016 | Gerdau ................ G01M 3/205 73/40.7 |

FOREIGN PATENT DOCUMENTS

| | | |
|---|---|---|
| EP | 1961439 B1 | 12/2009 |
| EP | 2168623 B1 | 9/2011 |
| WO | 2005047843 A1 | 5/2005 |
| WO | 2013109736 A1 | 7/2013 |
| WO | 2013134166 A1 | 9/2013 |

\* cited by examiner

FIG. 4

INTEGRATED VENTILATION AND LEAK DETECTION SYSTEM AND METHOD OF ASSEMBLY

BACKGROUND

The present disclosure relates generally to hazardous gas enclosures and, more specifically, to an integrated ventilation and leak detection system for use with a gas fuel module in a gas turbine fuel system.

Generally a gas turbine fuel system delivers fuel, such as propane, to a turbine combustion chamber to be combusted for power generation. Known components of such gas fuel systems include gas control valves and gas stop ratio valves housed in a gas fuel module enclosure. Typically any enclosure that contains hazardous gas, such as a gas fuel module, includes a ventilation system to dilute minor gas leaks within the enclosure. Additionally, a separate leak detection or scavenging system is used to detect any potential fuel leakage from within the enclosure.

At least some known gas fuel modules include a ventilation system located outside of the enclosure to provide ventilation therein. The ventilation system includes vent fans that extract air from the enclosure. However, because some fuel used in gas turbine engines is heavier than air, it tends to accumulate within a bottom part of the enclosure. Therefore, some known gas fuel modules also include a separate low point scavenging system within the enclosure. The scavenging system extracts a combination of air and gas from the bottom of the enclosure through a ducting system and is used to identify a presence of hazardous gas. In at least some cases, a use of two separate systems within the gas fuel module increases a cost of equipment, installation, and/or maintenance of the gas fuel module.

BRIEF DESCRIPTION

In one aspect, a ventilation and leak detection system for use in an enclosure is provided. The system includes a ventilation duct extending at least partially through an interior chamber defined in the enclosure. The ventilation duct includes at least one inlet end positioned within a lower portion of the interior chamber and an outlet end. The at least one inlet end includes at least one opening defined therein and sized to enable air and fuel within the enclosure to be drawn into the ventilation duct to ventilate the enclosure. The system further includes a detection unit coupled in flow communication with the ventilation duct proximate to the outlet end for detecting fuel entrained within flow drawn into the ventilation duct.

In a further aspect, a gas fuel module is provided. The gas fuel module includes a gas fuel module enclosure defining an interior chamber. A ventilation duct extending at least partially through the interior chamber, the ventilation duct includes at least one inlet end positioned within a lower portion of the interior chamber and an outlet end. The at least one inlet end includes at least one opening defined therein and sized to enable air and fuel within the enclosure to be drawn into the ventilation duct to ventilate the enclosure. The system further includes a detection unit coupled in flow communication with the ventilation duct proximate to the outlet end for detecting fuel entrained within flow drawn into the ventilation duct.

In another aspect, a method of assembling a ventilation and leak detection system for use in an enclosure is provided. The method includes coupling a ventilation duct within an interior chamber defined in the enclosure. The ventilation duct includes at least one inlet end positioned within a lower portion of the interior chamber and an outlet end. The at least one inlet end includes at least one opening defined therein and sized to enable air and fuel within the enclosure to be drawn into the ventilation duct to ventilate the enclosure. The method further includes coupling a detection unit in flow communication with the ventilation duct proximate to the outlet end, the detection unit is configured to detect fuel entrained within flow drawn into the ventilation duct.

DETAILED DESCRIPTION OF THE INVENTION

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Approximating language may be applied to modify any quantitative representation that could permissibly vary without resulting in a change in the basic function to which it is related. Accordingly, a value modified by a term or terms, such as "about," "approximately," and "substantially," is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

The exemplary integrated ventilation and leak detection systems and methods described herein overcome at least some of the disadvantages associated with known systems and methods for enclosure ventilation systems and leak detection systems. The embodiments described herein include a ventilation duct that is sized to enable air and fuel to be drawn into the duct to provide ventilation to an enclosure. Furthermore, a detection unit at an outlet of the ventilation duct facilitates the detection of fuel within the ventilation flow. Because, at least some known fuels used in gas turbine engines are heavier than air, in the exemplary embodiment, the ventilation duct includes at least one inlet end positioned within a lower portion of the enclosure to enable potential fuel leaks to be drawn into the ventilation duct and channeled through the detection unit.

Figure 1:
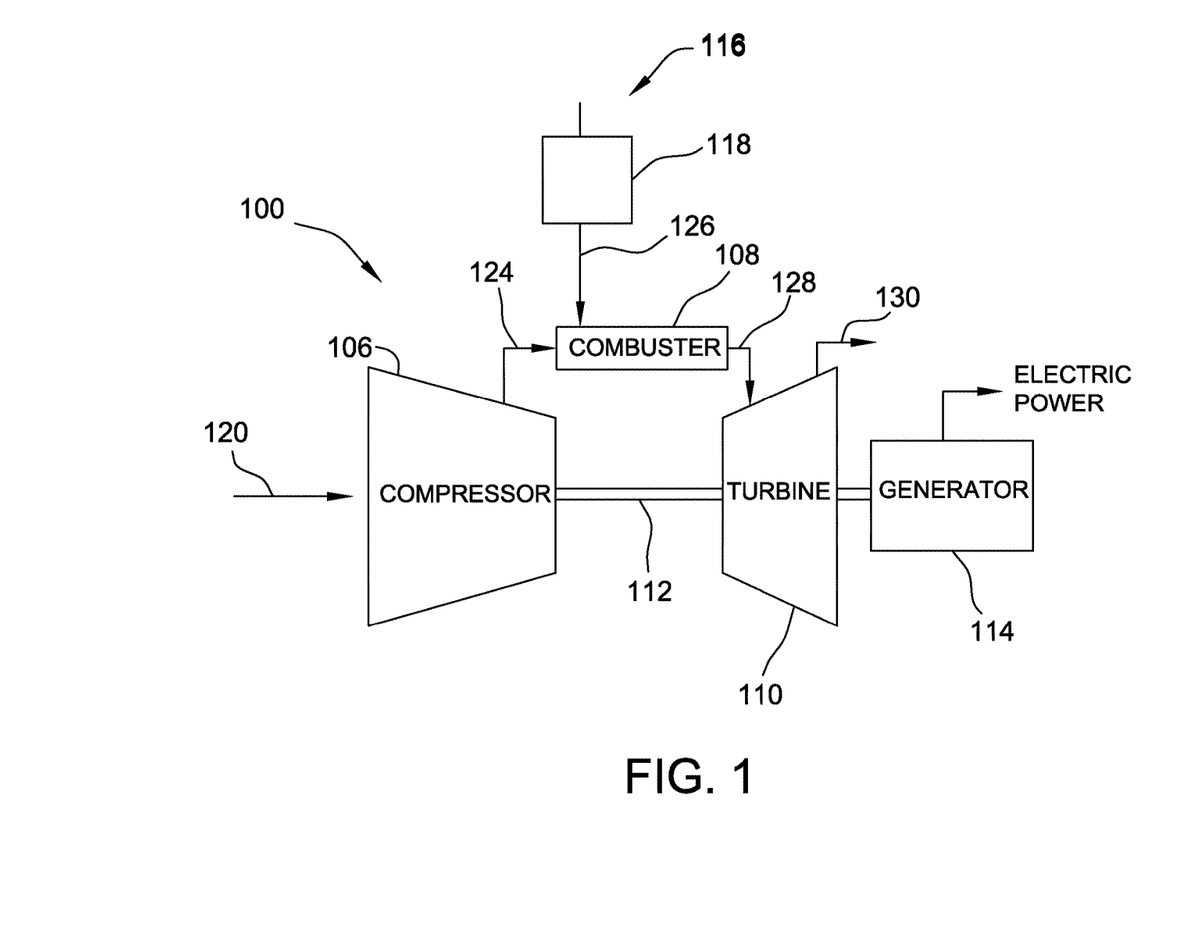
FIG. 1 is a schematic illustration of an exemplary gas turbine power system.

FIG. 1 is a schematic illustration of an exemplary gas turbine 100. In the exemplary embodiment, gas turbine 100 includes a compressor 106, a combustor section 108, and a turbine 110. Turbine 110 is coupled to compressor 106 via a rotor assembly 112. Gas turbine 100 is further coupled to a load 114, for example, an electric generator, via rotor assembly 112. Gas turbine 100 further includes a fuel system 116 in serial-flow relationship with combustor section 108. Fuel system 116 includes a gas fuel module enclosure 118 which in part houses control valves (not shown) for fuel system 116.

In operation, intake air 120 is drawn into compressor 106. Intake air 120 is at ambient air temperature. Compressor 106 compresses intake air 120 to higher pressures and temperatures prior to it being discharged as compressed air 124 towards combustor section 108. Compressed air 124 is mixed with fuel 126 supplied from fuel system 116 and the resulting mixture is burned within combustor section 108, generating combustion gases 128 that are directed towards turbine 110. Turbine 110 converts thermal energy within combustion gases 128 to mechanical rotational energy that is used to drive rotor assembly 112. A portion of the rotational energy is used to drive compressor 106, and the balance is used to drive load 114, for example to generate electric power. A hot exhaust gas mixture 130 is discharged from turbine 110 and, for example, channeled to either the atmosphere or to a Heat Recovery Steam Generator (not shown).

Figure 2:
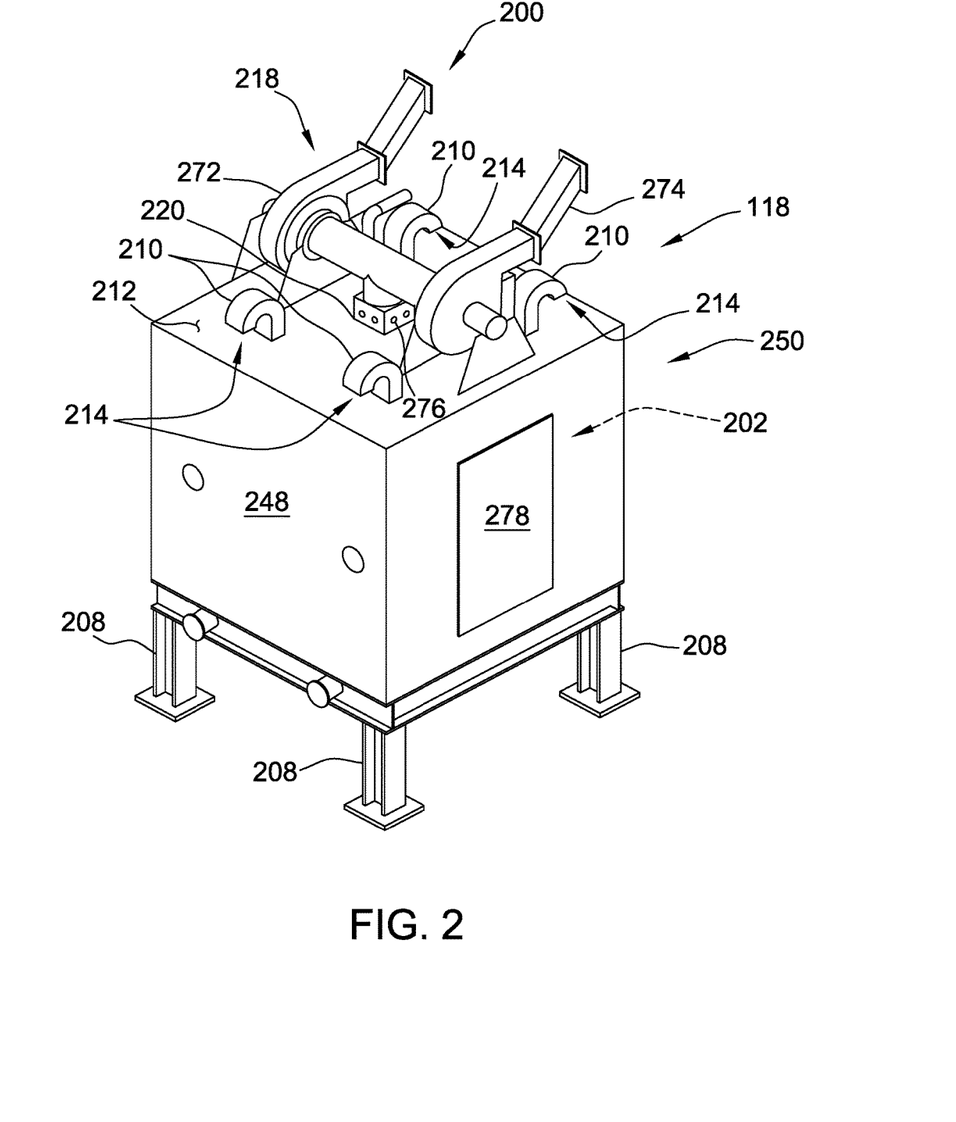
FIG. 2 is a perspective view of an exemplary gas fuel module enclosure that may be used with the gas turbine power system shown in FIG. 1.
Figure 3:
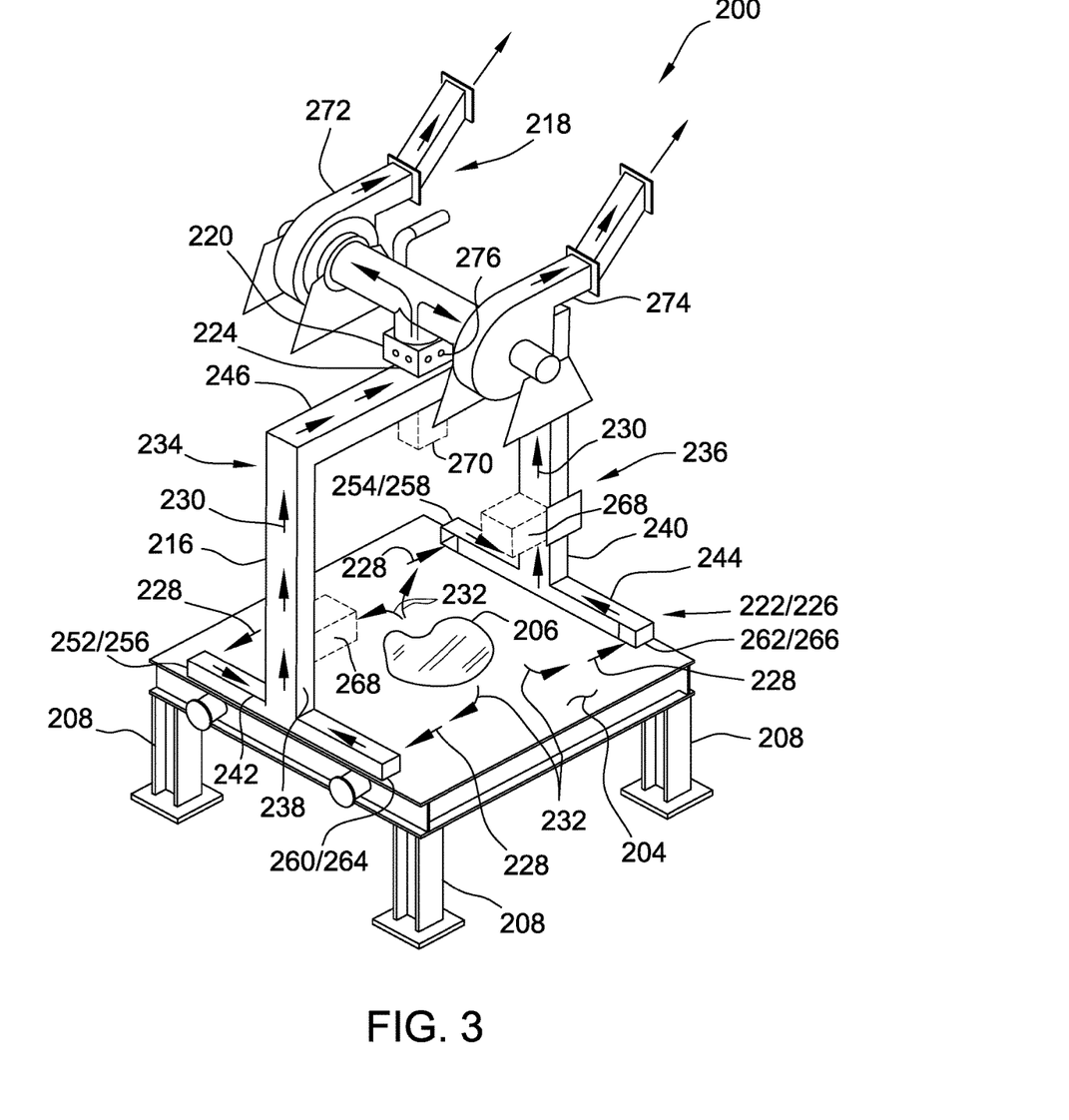
FIG. 3 is a perspective view of an exemplary integrated ventilation and leak detection system that may be used within the gas fuel module enclosure shown in FIG. 2.

FIG. 2 is a perspective view of an exemplary gas fuel module enclosure 118 that may be used with gas turbine 100 (shown in FIG. 1). FIG. 3 is a perspective view of an exemplary integrated ventilation and leak detection system 200 that may be used within gas fuel module enclosure 118 (shown in FIG. 1). With reference to FIGS. 1-3, in the exemplary embodiment, gas fuel module enclosure 118 defines an interior chamber 202 that is sized to receive at least a portion of fuel system 116. Specifically, enclosure 118 is sized to receive fuel piping, purge piping, and associated valves (all not shown) that facilitate channeling fuel 126 towards combustor section 108. As is known, in some embodiments, a gas fuel flange (not shown) may be a potential fuel leak source. Alternatively, other potential fuel leak sources may be located anywhere within fuel system 116 that is enclosed by gas fuel module enclosure 118.

Fuel system 116 channels fuel toward combustor section 108 that enables gas turbine power system 100 to function as described herein. For example, fuel system 116 may channel a fuel such as, but not limited to, butane and propane. Such fuels are generally heavier than air and will tend to accumulate at a floor 204 of enclosure 118 should a leak 206 occur within fuel system 116.

In the exemplary embodiment, gas fuel module enclosure 118 is generally box-shaped and includes a plurality of supports 208 that support floor 204. Gas fuel module enclosure 118 also includes at least one inlet vent 210 coupled to a roof 212 of enclosure 118 in flow communication with interior chamber 202. More specifically, in the exemplary embodiment, enclosure 118 includes a set of four inlet vents 210 that are generally positioned at each corner of roof 212. In alternative embodiments, enclosure 118 may include any suitable number of inlet vents 210 each positioned in any suitable location that enables inlet vents 210 to function as described herein, for example inlet vents 210 may be coupled to a side wall of enclosure 118. In the exemplary embodiment, each inlet vent 210 is J-shaped with an opening 214 that is offset from roof 212 and that faces towards roof 212 such that debris and moisture from the ambient air is restricted from entering enclosure 118. In alternative embodiments, each inlet vent 210 has any suitable shape that enables inlet vents 210 to function as described herein.

Further, in the exemplary embodiment, interior chamber 202 is also sized to receive at least a portion of integrated ventilation and leak detection system 200 therein. More specifically, ventilation and leak detection system 200 includes a ventilation duct 216 that extends within interior chamber 202, a fan assembly 218 coupled in flow communication with ventilation duct 216, and a hazardous gas detection unit 220. Ventilation duct 216 includes at least one inlet end 222 positioned within a lower portion of interior chamber 202, such as adjacent to floor 204. Ventilation duct 216 further includes at least one outlet end 224 positioned proximate to roof 212 of enclosure 118, and in flow communication with detection unit 220. Inlet end 222 includes at least one opening 226 that is sized to enable air 228 from within interior chamber 202 to be drawn into inlet end 222 of ventilation duct 216. In alternative embodiments, inlet and outlet ends 222 and 224 are positioned at any other location within enclosure 118 that enables ventilation and leak detection system 200 to function as described herein.

In operation, fan assembly 218 creates a negative pressure within enclosure 118 such that air 228 within interior chamber 202 is drawn through opening 226 and into ventilation duct 216 as ventilation flow 230. In addition, if a fuel leak 206 occurs within enclosure 118, then fuel 232 is also drawn through opening 226 and into ventilation duct 216. Specifically, such fuel 232 is entrained within ventilation flow 230. Ventilation flow 230, including enclosure air 228 and any entrained fuel 232, is channeled through ventilation duct 216 from inlet end 222 towards outlet end 224. At outlet end 224, ventilation flow 230 is channeled through detection unit 220, which detects whether fuel 232 is contained within ventilation flow 230.

In the exemplary embodiment, ventilation duct 216 includes a first leg 234 and an opposing second leg 236. More specifically, first leg 234 is adjacent to a wall 248 of enclosure 118, and second leg 236 is adjacent to an opposing wall 250 of enclosure 118. Each leg 234 and 236 is substantially T-shaped and includes a vertical member 238 and 240, respectively, and a horizontal member 242 and 244, respectively, such that horizontal members 242 and 244 extend generally parallel to floor 204, and below fuel system 116 located within interior chamber 202. Ventilation duct 216 also includes a cross duct 246 that couples vertical members 238 and 240 in flow communication and that forms a substantially U-shaped ventilation duct 216. In the exemplary embodiment, cross duct 246 is adjacent to roof 212 to facilitate reducing its footprint (i.e. the amount of space ventilation duct 216 occupies) within interior chamber 202. Outlet end 224 is positioned along cross duct 246 and is coupled in flow communication with detection unit 220. Alternatively, ventilation duct 216 may have any other shape and/or structure that enables ventilation duct 216 to function as described herein.

Further in the exemplary embodiment, each horizontal member 242 and 244 includes a respective first inlet end 252 and 254 that includes a first opening 256 and 258, respectively, defined therein. Similarly, each horizontal member 242 and 244 includes an opposite second inlet end 260 and 262, respectively, that includes a respective second opening 264 and 266. As such, ventilation duct 216 includes a total of four inlet ends 222 including four total openings 226. Openings 256, 258, 264, and 266 each have any shape and/or orientation that enables ventilation and leak detection system 200 to function as described herein. In alternative embodiments, ventilation duct 216 includes any suitable number of inlet ends 222 and openings 226 that enables ventilation duct 216 to function as described herein. In the exemplary embodiment, first leg horizontal member 242 is adjacent to wall 248 and second leg horizontal member 244 is adjacent to wall 250 such that ventilation duct 216 includes openings 256, 258, 264, and 266 that are generally located at each of the four corners of floor 204. In alternative embodiments, inlet ends 222 and openings 226 are located, with respect to floor 204, in any suitable arrangement that enables ventilation duct 216 to function as described herein.

In certain embodiments, a location of openings 226 within a lower portion of interior chamber 202, such as adjacent to floor 204, and a location of inlet vents 210 on roof 212, facilitates circulation of enclosure air 228 throughout enclosure 118 for ventilation. More specifically, ambient air (not shown) is drawn into interior chamber 202 through inlet vents 210 coupled on roof 212 via the negative pressure induced by fan assembly 218. Enclosure air 228 flows throughout interior chamber 202 and is drawn into ventilation duct openings 226, channeled through ventilation duct 216, and returns to the ambient air via fan assembly 218. Additionally or alternatively, a location of openings 226 within a lower section of interior chamber 202 increases a likelihood that any leaked fuel 232 is drawn into ventilation duct 216 for detection by detection unit 220. In alternative embodiments, openings 226 and inlet vents 210 are located in any suitable location and/or orientation that enables ventilation and leak detection system 200 to function as described herein.

In the exemplary embodiment, a cross-sectional area of each portion of ventilation duct 216 is sized to provide a consistent ventilation flow 230 therein and to facilitate consistent ventilation within enclosure 118. Specifically, the design of ventilation and leak detection system 200 reduces a volume of enclosure air 228 that stagnates within interior chamber 202. For example, a cross-sectional area of cross duct 246 is approximately the same size as a combined cross-sectional area of first leg vertical member 238 and second leg vertical member 240, and is approximately the same size as a combined cross-sectional area of each inlet end 252, 254, 260, and 262 of horizontal members 242 and 244. As such, in the exemplary embodiment, enclosure air 228 is drawn at approximately the same rate and generally equally from all corners of interior chamber 202. Alternatively, each portion of ventilation duct 216 may have any cross-sectional area and/or shape that enables ventilation and leak detection system 200 to function as described herein.

In some embodiments, ventilation duct 216 also includes a middle inlet 268 extending between roof 212 and floor 204 of enclosure 118 on each respective leg 234 and 236. Middle inlet 268 further facilitates the ventilation of a middle section of interior chamber 202. Additionally or alternatively, ventilation duct 216 may include an upper inlet 270 on cross duct 246 and adjacent to roof 212. Upper inlet 270 enhances the ventilation of an upper section of interior chamber 202.

In the exemplary embodiment, hazardous gas detection unit 220 is coupled in flow communication with ventilation duct 216 proximate to outlet end 224 and adjacent to enclosure roof 212. For example, detection unit 220 is coupled to an exterior surface of enclosure 118. Detection unit 220 detects fuel 232 within ventilation flow 230 that passes through before being discharged at fan assembly 218 into the ambient air. Because detection unit 220 is at outlet end 224, detection unit 220 can detect fuel leaks adjacent to any of inlet ends 222.

Detection unit 220 may be any fuel detection mechanism that enables ventilation and leak detection system 200 to function as described herein. In the exemplary embodiment, detection unit 220 includes at least one sample probe 276 that is coupled in flow communication with a sensor system 278. Sample probes 276 are positioned adjacent to outlet end 224 and within ventilation flow 230. Sample probes 276 include a nozzle that extracts a small mass of air from ventilation flow 230 and channels the air to sensor system 278. Sensor system 278 is positioned at an exterior wall of enclosure 118 and includes, for example, but not by way of limitation, at least one of infrared, catalytic bead, semiconductor, and oxidation sensor systems, which facilitate detecting fuel 232 within the air extracted by sample probes 276. In alternative embodiments, detection unit 220, including sample probes 276 and sensor system 278, may be positioned at any other location that enables ventilation and leak detection system 200 to function as described herein.

In operation, detection unit 220 determines an occurrence of potential fuel leaks when a concentration of fuel 232 in ventilation flow 230 is above a predetermined threshold. For example, if detection unit 220 determines that a lower explosive limit for fuel 232 is exceeded within interior chamber 202, then a signal is sent to operations control (not shown) and gas fuel module 118 is shut down or fuel system 116 is switched to another fuel source. In some embodiments, if detection unit 220 determines that a concentration of fuel 232 is greater than about 18% of the lower explosive limit for fuel 232, then a first alarm level signal is sent to operations control, and if detection unit 220 determines that a concentration of fuel 232 is greater than about 8% of the lower explosive limit for fuel 232, then a second alarm level signal is sent to operations control. In alternative embodiments, detection unit 220 may trigger any suitable number of alarm level signals in response to any suitable corresponding detected concentration of fuel 232.

Further in the exemplary embodiment, fan assembly 218 includes two fans 272 and 274 in flow communication with ventilation duct 216 and detection unit 220. For example, each fan 272 and 274 is downstream of ventilation duct 216 and coupled to an exterior surface of roof 212. In some embodiments, two fans 272 and 274 are provided such that one can be in operation and the other is reserved for back up, thereby facilitating constant ventilation of enclosure 118. In alternative embodiments, fan assembly 218 includes any suitable number of fans located at any suitable position that enables system 200 to function as described herein. In operation, fan assembly 218 creates a negative pressure within enclosure 118 such that ambient air is drawn into interior chamber 202 via inlet vents 210, enclosure air 228 is drawn into ventilation duct 216, and ventilation flow 230 is exhausted back out to the ambient air.

Figure 4:
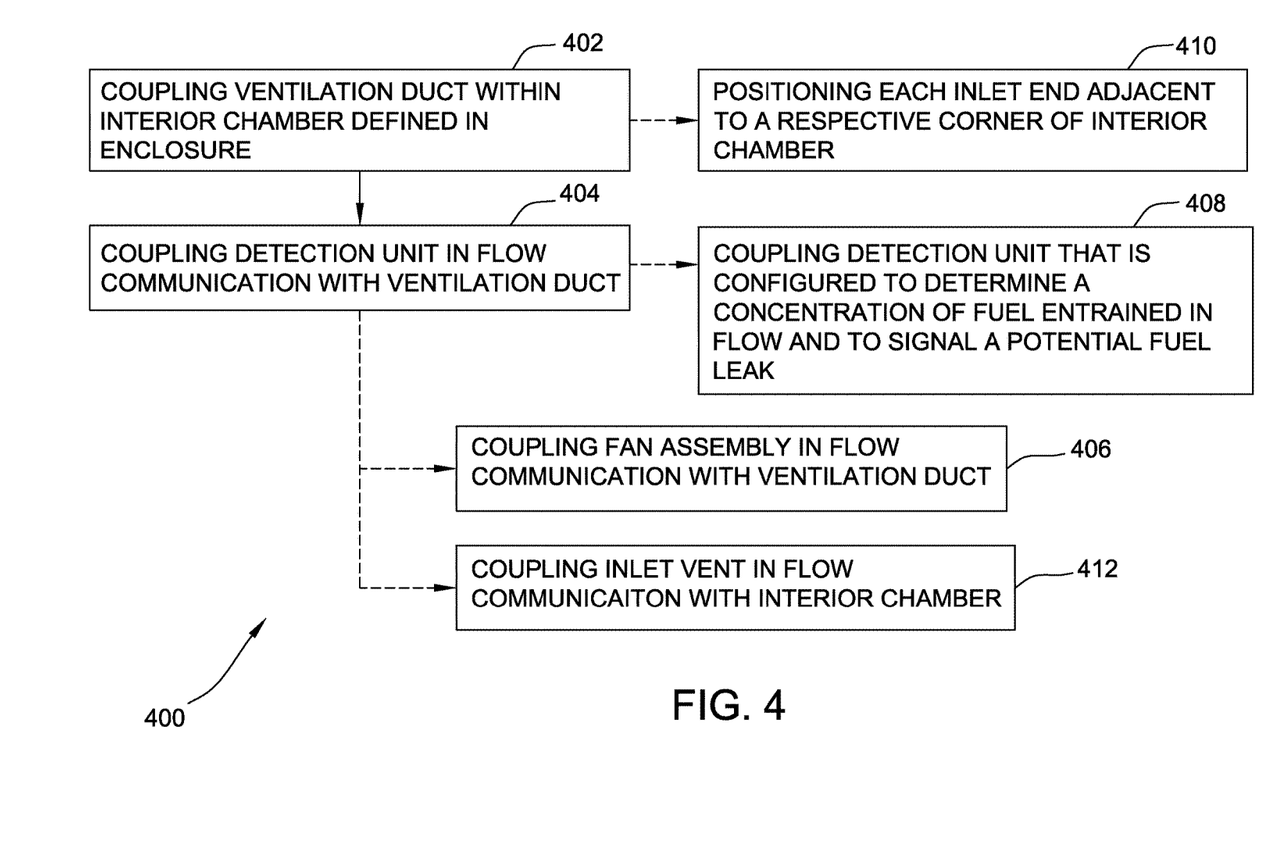
FIG. 4 is a flow diagram of an exemplary method of assembling an integrated ventilation and leak detection system, such as the integrated ventilation and leak detection system shown in FIGS. 1-3.

An exemplary method 400 of assembling an integrated ventilation and leak detection system, such as system 200, is illustrated in the flow diagram of FIG. 4. With reference also to FIGS. 1-3, exemplary method 400 includes coupling 402 a ventilation duct, such as ventilation duct 216, within an interior chamber defined in an enclosure, such as interior chamber 202 of gas fuel module enclosure 118. Furthermore, method 400 includes coupling 404 a detection unit, such as detection unit 220, in flow communication with the ventilation duct.

In some embodiments, method 400 includes coupling 406 a fan assembly, such as fan assembly 218, in flow communication with the ventilation duct. In certain embodiments, method 400 includes coupling 408 the detection unit that is configured to determine a concentration of the fuel, such as fuel 232, and to signal a potential fuel leak. In other embodiments, method 400 includes positioning 410 a plurality of inlet ends, such as inlet ends 252, 254, 260, and 262, adjacent to a respective corner of the interior chamber. In yet other embodiments, method 400 further includes coupling 412 at least one inlet vent, such as inlet vent 210, in flow communication with the interior chamber.

Exemplary embodiments of integrated ventilation and leak detection systems and methods are described above in detail and provide a system that ventilates an enclosure as well as detecting potential fuel leaks. The embodiments described herein include a ventilation duct that is sized to enable air and fuel to be drawn into the duct and exhausted, while providing ventilation to the enclosure. Furthermore, a detection unit is proximate to an outlet of the ventilation duct to detect fuel entrained within the ventilation flow. In some embodiments, fuels used in gas turbines are heavier than air, and the ventilation duct includes at least one inlet end positioned within a lower portion of the enclosure such that potential fuel leaks can be drawn into the ventilation duct and channeled through the detection unit. In certain embodiments, the integrated ventilation and leak detection system facilitates reducing equipment, installation, and maintenance costs by combining what are typically two separate systems, a ventilation system and a hazardous gas detection system. Furthermore, the system described herein maintains the reliability of gas leak detection for heavy gas fuels in a single integrated system with enclosure ventilation.

An exemplary technical effect of the methods, systems, and apparatus described herein includes at least one of: (a) simplify an integrated ventilation and leak detection system; (b) maintain ventilation within an enclosure containing heavy gas fuels; (c) maintain reliability for gas leak detection; (d) reduce equipment costs; (e) reduce installation costs; and (f) reduce maintenance costs.

The systems and methods described herein are not limited to the specific embodiments described herein. For example, components of each system and/or steps of each method may be used and/or practiced independently and separately from other component and/or steps described herein. In addition, each component and/or step may also be used and/or practiced with other assemblies and methods.

While the disclosure has been described in terms of various specific embodiments, those skilled in the art will recognize that the disclosure can be practiced with modification within the spirit and scope of the claims. Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, and feature of a drawing may be referenced and/or claimed in combination with any feature of any other drawing.

What is claimed is:

1. A ventilation and leak detection system for use in an enclosure, said system comprising:
   a ventilation duct extending at least partially through an interior chamber defined in the enclosure, said ventilation duct comprising a plurality of inlet ends positioned within a lower portion of the interior chamber and an outlet end, wherein each of said plurality of inlet ends is adjacent to a respective corner of the interior chamber and comprises at least one opening defined therein and sized to enable air and fuel within the enclosure to be drawn into said ventilation duct to ventilate the enclosure; and
   a detection unit coupled in flow communication with said ventilation duct proximate to said outlet end for detecting fuel entrained within flow drawn into said ventilation duct.

2. The system in accordance with claim 1 further comprising a fan assembly coupled in flow communication with said ventilation duct, said fan assembly is configured to:
   create a negative pressure within the enclosure to draw the flow into said ventilation duct; and
   exhaust the flow within said ventilation duct to an exterior location.

3. The system in accordance with claim 2, wherein said fan assembly comprises a first fan and a second fan, each said fan is coupled to an enclosure roof.

4. The system in accordance with claim 1, wherein said detection unit is configured to:
   determine a concentration of fuel entrained in the flow; and
   signal a potential fuel leak when the fuel concentration is greater than a predetermined threshold.

5. The system in accordance with claim 1, wherein said detection unit comprises an infrared sensor.

6. The system in accordance with claim 1, wherein said detection unit comprises a catalytic sensor.

7. The system in accordance with claim 1, wherein at least a portion of said ventilation duct proximate to at least one of said plurality of inlet ends extends substantially parallel to a floor of the enclosure.

8. The system in accordance with claim 1, wherein said ventilation duct further comprises at least one middle inlet extending within a middle portion of the interior chamber.

9. The system in accordance with claim 1, wherein said ventilation duct further comprises at least one upper inlet defined within an upper portion of the interior chamber.

10. The system in accordance with claim 1 further comprising at least one inlet vent in flow communication with the interior chamber, said at least one inlet vent configured to channel ambient air into the interior chamber.

11. A gas fuel module comprising:
    a gas fuel module enclosure defining an interior chamber;
    a ventilation duct extending at least partially through said interior chamber, said ventilation duct comprising a plurality of inlet ends positioned within a lower portion of said interior chamber and an outlet end, wherein each of said plurality of inlet ends is adjacent to a respective corner of the interior chamber and comprises at least one opening defined therein and sized to enable air and fuel within said enclosure to be drawn into said ventilation duct to ventilate said enclosure; and
    a detection unit coupled in flow communication with said ventilation duct, said detection unit located proximate to said outlet end and configured to detect fuel entrained within flow drawn into said ventilation duct.

12. The gas fuel module in accordance with claim 11 further comprising a fan assembly coupled in flow communication with said ventilation duct, said fan assembly is configured to:
    create a negative pressure within said enclosure to draw the flow into said ventilation duct; and
    exhaust the flow within said ventilation duct to an exterior location.

13. The gas fuel module in accordance with claim 11, wherein said detection unit is configured to:

determine a concentration of fuel entrained in the flow; and signal a potential fuel leak when the fuel concentration is greater than a predetermined threshold.

14. The gas fuel module in accordance with claim 11 further comprising at least one inlet vent coupled to an enclosure roof in flow communication with said interior chamber, said at least one inlet vent configured to channel ambient air into said interior chamber.

15. A method of assembling a ventilation and leak detection system for use in an enclosure, said method comprising:

coupling a ventilation duct within an interior chamber defined in the enclosure, the ventilation duct includes a plurality of inlet ends positioned within a lower portion of the interior chamber and an outlet end, wherein each of the plurality of inlet ends includes at least one opening defined therein and sized to enable air and fuel within the enclosure to be drawn into the ventilation duct to ventilate the enclosure;

positioning each of the plurality of inlet ends adjacent to a respective corner of the interior chamber; and coupling a detection unit in flow communication with the ventilation duct proximate to the outlet end, wherein the detection unit is configured to detect fuel entrained within flow drawn into the ventilation duct.

16. The method in accordance with claim 15 further comprising coupling a fan assembly in flow communication with the ventilation duct, wherein the fan assembly is configured to create a negative pressure within the enclosure to draw the flow into the ventilation duct and to exhaust the flow within the ventilation duct to an exterior location.

17. The method in accordance with claim 15, wherein coupling the detection unit comprises coupling the detection unit that is configured to determine a concentration of the fuel entrained in the flow and to signal a potential fuel leak when the fuel concentration is greater than a predetermined threshold.

18. The method in accordance with claim 15 further comprising coupling at least one inlet vent in flow communication with the interior chamber, the at least one inlet vent configured to channel ambient air into the interior chamber.

* * * * *